United States Patent [19]

Kokolis et al.

[11] Patent Number: 4,834,179
[45] Date of Patent: May 30, 1989

[54] SOLVENT FLOODING WITH A HORIZONTAL INJECTION WELL IN GAS FLOODED RESERVOIRS

[75] Inventors: George P. Kokolis, Houston, Tex.; Kevin P. McCoy, Calgary, Canada

[73] Assignees: Texaco Inc., White Plains, N.Y.; Texaco Canada Resources, Alberta, Canada

[21] Appl. No.: 140,519

[22] Filed: Jan. 4, 1988

[51] Int. Cl.$^4$ ............................................. E21B 43/22
[52] U.S. Cl. ..................................... 166/268; 166/50
[58] Field of Search ................. 166/50, 266, 268, 274, 166/306

[56] References Cited

U.S. PATENT DOCUMENTS

| | | | |
|---|---|---|---|
| 2,365,591 | 12/1944 | Ranney | 166/263 X |
| 3,788,398 | 1/1974 | Shephard | 166/274 X |
| 3,854,532 | 12/1974 | Braden, Jr. | 166/274 |
| 3,856,086 | 12/1974 | Braden, Jr. | 166/274 |
| 3,878,892 | 4/1975 | Allen et al. | 166/274 X |
| 4,022,278 | 5/1977 | Allen | 166/274 X |
| 4,249,607 | 2/1981 | Allen | 166/274 |
| 4,393,936 | 7/1983 | Josendal | 166/268 X |
| 4,410,216 | 10/1983 | Allen | 166/50 X |
| 4,510,997 | 4/1985 | Fitch et al. | 166/50 X |
| 4,662,441 | 5/1987 | Huang et al. | 166/50 X |

*Primary Examiner*—George A. Suchfield
*Attorney, Agent, or Firm*—Jack H. Park; Kenneth R. Priem; Harold J. Delhommer

[57] ABSTRACT

The invention is a method for recovering residual hydrocarbons from a reservoir which has been previously swept by gas. The invention steps comprise drilling and completing at least one horizontal injection well relatively near the top of the reservoir, injecting a miscible solvent through the horizontal injection well to create a curtain of solvent falling through the previously gas swept reservoir, and producing hydrocarbons and other fluids that have been banked below the falling solvent curtain through a vertical or horizontal production well.

8 Claims, 1 Drawing Sheet

SOLVENT FLOODING WITH A HORIZONTAL INJECTION WELL IN GAS FLOODED RESERVOIRS

BACKGROUND OF THE INVENTION

This invention concerns a method for recovering residual hydrocarbons with a miscible solvent flood from a reservoir which has been previously gas flushed. More particularly, the method employs at least one horizontal well to inject a miscible solvent and create a curtain of solvent falling through the reservoir.

Horizontal wells have been investigated and tested for oil recovery for quite some time. At present, the use of horizontal wells is usually limited to formations containing highly viscous crude. In the future, horizontal wells will be used more widely for other types of formations. It seems likely that horizontal wells will soom become a chief method of producing tar sand formations and other highly viscous oils which cannot be efficiently produced by conventional methods because of their high viscosity. Most heavy oil and tar sand formations cannot be economically produced by surface mining techniques because of their formations depth.

Various proposals have been set forth for petroleum recovery with horizontal well schemes. Most have involved steam injection or in situ combustion with horizontal wells serving as both injection wells and producing wells. Steam and combustion processes have been employed to heat viscous formations to lower the viscosity of the petroleum as well as to provide the driving force to push the hydrocarbons toward a well.

A system of using parallel horizontal wells drilled laterally from subsurface tunnels into the lower portion of a tar sand formation is disclosed in U.S. Pat. No. 4,463,988. The described process injects a displacing means such as steam into the boreholes to cause hydrocarbons to flow into the lower portion of the lateral borehole and be produced to the surface.

U.S. Pat. No. 4,577,691 discloses a plurality of parallel horizontal wells arranged in a vertical plane whereby a thermal fluid can be injected into upper wells to drive hydrocarbons down from the area of the upper wells to the horizontal wells immediately below and lying in the same vertical plane. U.S. Pat. No. 4,700,779 discloses a pattern of four or more horizontal wells lying parallel to each other in a horizontal plane within a thin reservoir. The wells in a horizontal plane are used with a combination steam and water injection process to sweep oil from one end to the other end of the pattern.

The use of two or more parallel horizontal injection and production wells is disclosed in U.S. Pat. No. 4,598,770. In this reference, two horizontal wells are drilled parallel to each other at the bottom of the hydrocarbon formation. A thermal fluid is injected through one of the horizontal wells and that fluid and hydrocarbons are produced at the other parallel horizontal well. U.S. Pat. Nos. 4,385,662 and 4,510,997 have a disclosure similar to U.S. Pat. No. 4,598,770 except that a hydrocarbon solvent is injected and allowed to soak in a tar sand formation. Thereafter, a driving fluid such as water is injected to drive the formation fluids and solvent to the horizontal production well in U.S. Pat. No. 4,510,997. The method of U.S. Pat. No. 4,385,662 adds a second injection of solvent followed by a soak period before the drive fluid injection.

U.S. Pat. No. 4,022,279 discloses a system for conditioning an oil or gas formation by drilling horizontal spiralling holes from a vertical well. The patent teaches the injection of unnamed "stimulating fluids" into the spiralling wellbores to provide a way to stimulate more formation area at a predetermined distance around the vertical well than a series of horizontal wells.

It is known that the use of horizontal injection wells increase the areal sweep of a miscible flood. An increase in areal sweep efficiency for miscible solvent floods has been noted for the use of horizontal injection wells over vertical point source injection wells. Please see Chen, S. M., Olynyk, J., "Sweep Efficiency Improvement Using Horizontal Wells Or Tilted Horizontal Wells In Miscible Floods," CIM Paper No. 85-36-62, Edmonton, Canada (June 2-5, 1985), pages 385-400. Chen and Olynyk noted that the greatest percentage increase in sweep efficiency occurred at the most adverse mobility ratios. A similar increase in areal sweep efficiency was noted for horizontal well injections of carbon dioxide versus point-source injection from vertical wells. See Jones, S.E., "Effects Of Horizontal Wellbore Injection Versus Point-Source Injection On The Recovery Of Oil By $CO_2$," U.S. Department of Energy Report No. DOE/MC/21207-T23, May 1986.

A related process is described in copending U.S. patent application Ser. No. 140,708, filed Jan. 4, 1988, now U.S. Pat. No. 4,794,987. The disclosed process further employs a second set of injection wells to inject a drive fluid between a vertically oriented boundary of the reservoir and injected miscible solvent to drive the falling miscible solvent horizontally through the reservoir as it falls.

SUMMARY OF THE INVENTION

The invention is a method for recovering residual hydrocarbons from a reservoir which has been previously swept by gas. The invention steps comprise drilling and completing at least one horizontal injection well relatively near the top of the reservoir, injecting a miscible hydrocarbon solvent through the horizontal injection well to create a curtain of solvent falling through the previously gas swept reservoir, and producing hydrocarbons and other fluids that have been banked below the falling solvent curtain through a production well.

DETAILED DESCRIPTION

Figure 1:
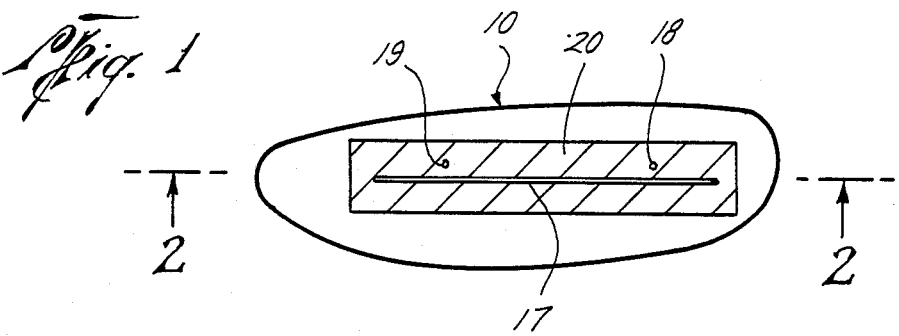
FIG. 1 is a top sectional view of a small vertical reef reservoir penetrated by a horizontal injection well and a vertical production well needed to practice the invention.

The recovery of residual oil from a reservoir which has been previously gas flushed presents major technical and economical problems. In such reservoirs, the oil saturation is relatively near residual oil saturation to gas. The portion of the reservoir which has been swept by gas is frequently referred to as a secondary gas cap.

The solvents required for miscible flooding usually have a substantially greater density than the in-place gas that is left behind in a secondary gas cap. Thus, if a miscible solvent in injected into the secondary gas cap the injected solvent tends to fall quickly through the reservoir and fails to achieve significant areal coverage. The injected solvent falls in a relatively small area around vertical injection wells, in a 100 to 500 foot diameter cylinder at best. Thus, the use of vertical injection wells to inject solvent in a reservoir previously gas flooded results in the solvent quickly falling through the reservoir, leaving behind swept areas resembling small diameter vertical chimneys. The number of vertical injection wells required to sweep residual oil from such a reservoir cannot be supported economically by the produced oil.

There are a substantial number of candidate reservoirs to which the present invention may be applied to recover significant amounts of residual oil. Many of these previously gas flushed reservoirs are vertical reef reservoirs in Western Canada that have a substantial vertical thickness and are generally well bounded. They range in size from large vertical reservoirs such as the Bonnie Glen Reservoir in Alberta, Canada which measures $7\frac{1}{2} \times 3\frac{1}{2}$ miles to small pinnacle reef reservoirs which may be 5 to 20 acres in size and contain only one well. Although this invention may be used in vertically oriented reservoirs of all sizes, the limiting factor is cost. A reservoir with a larger areal extent requires more wells. This process is most economically suited for small areal reef reservoirs having a substantial vertical thickness.

Because of the large density difference between gas and residual oil fluids left in the gas flushed zone and the miscible flooding solvent, injection of miscible solvent into a horizontal well results in the solvent falling in a curtain or sheet over the length of the horizontal injection well. Assuming a substantially homogeneous reservoir matrix, the solvent should sweep the area of the reservoir below it in a curtain with a width of several hundred feet. The solvent curtain will gradually widen as it falls farther below the horizontal injection well.

Preferably, the solvent will be injected from perforations in the sides or top of the horizontal injection well. Perforations on the bottom of the horizontal well will result in a smaller areal sweep.

The horizontal injection well whould be completed at or relatively near the top of the swept reservoir. One or more production wells are completed substantially below the horizontal injection well relatively near the bottom of the reservoir. The production well may be a vertical or horizontal well.

A multiple number of horizontal injection wells may be employed to inject the miscible solvent. In fact, a number of horizontal injection wells will be required unless the reservoir is relatively small. Two preferred embodiments of multiple horizontal injection wells include a parallel arrangement of horizontal wells or a staggered parallel arrangement. The horizontal injection wells may also be arranged in X-shaped patterns, curved figures, or any other pattern which could be reasonably believed to sweep the formation as solvent falls below the horizontal injection wells.

The invention requires the use of a solvent which is miscible in some fashion, first contact miscible or multiple contact miscible with the residual oil and gas in the gas flushed region of the reservoir. Such a solvent could be an alkane having about 2 to about 10 carbon atoms, preferably ethane, propane, and butane or a mixture of such, naphtha, kerosene, carbon dioxide, a mixture of carbon dioxide and nitrogen, or mixtures thereof.

Flood costs may be reduced by producing at least a portion of the miscible solvent curtain for recovery or reinjection. This can be done by the use of a horizontal or vertical production well located at the bottom of the reservoir substantially below the horizontal injection well.

Figure 2:
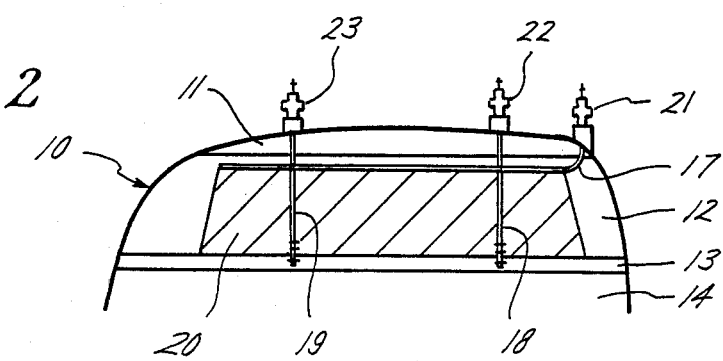
FIG. 2 illustrates a side view along line 2—2 of FIG. 1 which further illustrates the falling curtain of solvent.
Figure 3:
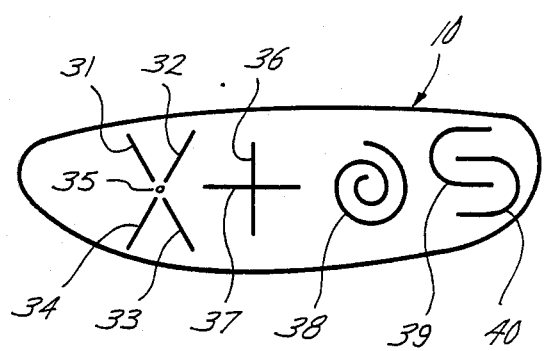
FIG. 3 is a top view of the reservoir of FIG. 1 which further illustrates alternate horizontal well injection patterns.

FIGS. 1 and 2 illustrate top and side views of a small vertical reef reservoir. FIG. 3 is a top sectional view of a vertical reef reservoir showing different options for horizontal solvent injection wells. These figures are not drawn to scale.

In FIGS. 1-2, vertical reef reservoir 10 is shown penetrated by horizontal injection well 17, and vertical production wells 18 and 19. The side view of FIG. 2, taken along line 2—2 of FIG. 1, illustrates the original gas cap 11, the secondary gas cap 12 which is the oil zone previously swept by a gas flood, an oil layer 13, and aquifer 14. Wellheads 21, 22, and 23 are illustrated for wells 17, 18, and 19, respectively.

FIGS. 1 and 2 illustrate the falling solvent curtain shown as shaded area 20. The injection of the miscible solvent through horizontal injection well 17 creates the solvent curtain 20. Hydrocarbons and other fluids that have been banked below falling solvent curtain 20 may be recovered through vertical production wells 18 and 19. Falling solvent may also be recovered for another use or reinjection through productions wells 18 and 19 or other wells drilled for that purpose.

FIG. 3 illustrates various horizontal injection well options which may be employed in the invention process. Multiple horizontal injection wells 31, 32, 33, and 34 may be whipstocked off a single multiple hole 45. This type of arrangement allows for the drilling of multiple horizontal injection or production wells from a single well pad, resulting in a lower cost for a horizontal well. Another option is to use crossed horizontal injection wells such as wells 36 and 37. Curved horizontal well arrangements may also prove successful, such as the spiralled well 38 and curved wells 39 and 40 nested within each other. The above horizontal injection well designs are merely suggestive of the many different approaches which may be taken to create falling curtains of miscible solvent to best produce the residual oil in the secondary gas cap. These suggestions should not be considered to limit the scope of the invention.

The diameter and length of the horizontal wells and their perforation intervals are not critical, except that such factors will affect the well spacing and the economics of the process. Optimum well spacing may vary considerably from formation to formation and may depend upon many factors known to those skilled in the art. It is not necessary that the well spacings in a particular pattern be equal. Such decisions should be determined by conventional drilling criteria, the characteristics of the specific formation, the economics of a given situation and the well known art of drilling horizontal wells.

Such horizontal wells must extend from the surface and run a substantially horizontal distance within the hydrocarbon formation. The optimum number of horizontal wells and their distance from each other and from other vertical wells which may also be employed is a balance of economic criteria. Perforation size will be a function of other factors such as flow rate, temperatures and pressures employed in a given operation.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method for recovering residual hydrocarbons from a reservoir having a substantial vertical thickness, which comprises:

drilling and completing at least one horizontal injection well relatively near the top of the reservoir, said reservoir having an oil saturation relatively near residual oil saturation to gas;

injecting a miscible solvent into the reservoir through the horizontal injection well to create a curtain of solvent falling through the reservoir, said solvent having a substantially greater density than the gas in the reservoir; and producing through at least one horizontal production well completed relatively near the bottom of the reservoir, hydrocarbons and other fluids that have been driven downward by the falling solvent curtain.

2. The method of claim 1, further comprising the use of multiple horizontal injection wells.

3. The method of claim 2, wherein the multiple horizontal injection wells are substantially parallel.

4. The method of claim 2, wherein the multiple horizontal injection wells form an X-shaped pattern.

5. The method of claim 1, wherein the miscible solvent is an alkane having about 2 to about 10 carbon atoms, naphtha, kerosene, carbon dioxide, a mixture of carbon dioxide and nitrogen, or mixtures thereof.

6. The method of claim 1, further comprising producing at least a portion of the miscible solvent from the solvent curtain relatively near the bottom of the reservoir.

7. The method of claim 6, further comprising reinjecting the solvent produced from the solvent curtain into the formation through the horizontal injection well.

8. A method for recovering residual hydrocarbons from a reservoir having a substantial vertical thickness, which comprises:

drilling and completing multiple horizontal injection wells relatively near the top of the reservoir, said reservoir having an oil saturation relatively near residual oil saturation to gas;

injecting a miscible solvent into the reservoir through the horizontal injection wells to create multiple curtains of solvent falling through the reservoir, said miscible solvent being an alkane having about 2 to about 10 carbon atoms, naphtha, kerosene, or mixtures thereof; and producing through multiple horizontal production wells hydrocarbons and other fluids that have been driven downward by the falling solvent curtain, said production wells completed relatively near the bottom of the reservoir and below the horizontal injection wells.

* * * * *